US006687831B1

(12) United States Patent
Albaugh et al.

(10) Patent No.: US 6,687,831 B1
(45) Date of Patent: Feb. 3, 2004

(54) METHOD AND APPARATUS FOR MULTIPLE SECURITY SERVICE ENABLEMENT IN A DATA PROCESSING SYSTEM

(75) Inventors: Virgil Anthony Albaugh, Austin, TX (US); Messaoud Benantar, Austin, TX (US); John Alexander Buslawski, Austin, TX (US); David Yu Chang, Austin, TX (US); Robert Howard High, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,366

(22) Filed: Apr. 29, 1999

(51) Int. Cl.⁷ .............................................. G06F 11/00
(52) U.S. Cl. ...................................... 713/201; 709/227
(58) Field of Search ............................... 713/200, 201; 707/103, 4; 709/227, 215, 203, 315

(56) References Cited

U.S. PATENT DOCUMENTS

| | | | |
|---|---|---|---|
| 5,727,145 A | * 3/1998 | Nessett et al. ............... | 395/186 |
| 6,230,160 B1 | * 5/2001 | Chan et al. .................. | 707/103 |
| 6,253,253 B1 | * 6/2001 | Mason et al. ................ | 709/315 |
| 6,330,677 B1 | * 12/2001 | Madoukh ..................... | 713/200 |
| 6,336,118 B1 | * 1/2002 | Hammond .................... | 707/103 |
| 6,356,930 B2 | * 3/2002 | Garg ........................... | 709/201 |
| 6,425,017 B1 | * 7/2002 | Dievendorff et al. ........ | 709/315 |
| 6,453,320 B1 | * 9/2002 | Kukura et al. ............... | 707/103 |
| 6,457,041 B1 | * 9/2002 | Hutchison .................... | 709/203 |
| 6,477,527 B2 | * 11/2002 | Carey et al. .................. | 707/4 |
| 6,490,624 B1 | * 12/2002 | Sampson et al. ............ | 709/227 |
| 2001/0051949 A1 | * 12/2001 | Carey et al. ................. | 707/103 |

OTHER PUBLICATIONS

A Discussion of the Object Management Architecture; Jan. 1997; 1–1—A–8; Object Management Group.

* cited by examiner

*Primary Examiner*—Norman M. Wright
(74) *Attorney, Agent, or Firm*—Duke W. Yee; David A. Mims, Jr.; Wayne P. Bailey

(57) ABSTRACT

A method and apparatus in a computer system for establishing a connection between a client proxy object and a server target object. A request is received from the client proxy object to access the server target object, wherein the request includes an identification of a type of communication and type of message to be sent to the server target object. A connection object is identified based on the type of communication and the type of message. The connection object implementing the type of communication is returned, wherein the connection between the client proxy object and the server target object is facilitated using the connection object.

19 Claims, 9 Drawing Sheets

METHOD AND APPARATUS FOR MULTIPLE SECURITY SERVICE ENABLEMENT IN A DATA PROCESSING SYSTEM

BACKGROUND OF THE INVENTION

1. Technical Field

The present invention relates generally to an improved data processing system and in particular to a method and apparatus for providing a connection between objects in a data processing system. Still more particularly, the present invention provides a method and apparatus for dynamically providing connections with different types of security between a client proxy object and a server target object.

2. Description of Related Art

In providing communication and data exchange between objects of different types of origin and design, the Common Object Request Broker Architecture (CORBA) has been designed by the Object Management Group (OMG) to provide interoperability among the rapidly proliferating number of hardware and software products in the marketplace. CORBA specifies a system, which provides interoperability between objects in a heterogeneous, distributed environment and in a way transparent to the programmer. The OMG Object Model defines common object semantics for specifying the externally visible characteristics of objects in a standard and implementation-independent way. In this model clients request services from objects (which will also be called server target objects) through a well-defined interface. This interface is specified in OMG IDL (Interface Definition Language). A client proxy object accesses an object by issuing a request to the object. A client proxy object represents the server target object in the client process. The request is an event, and it carries information including an operation, the object reference of the service provider, and actual parameters (if any). The object reference is an object name that defines an object reliably.

The central component of CORBA is the Object Request Broker (ORB). It encompasses all of the communication infrastructure necessary to identify and locate objects, handle connection management, and deliver data. In general, the ORB Core is the most crucial part of the Object Request Broker; it is responsible for communication of requests.

The basic functionality provided by the ORB consists of passing the requests from client proxy objects to the object implementations on which they are invoked. In order to make a request the client proxy object can communicate with the ORB. Core through the IDL stub or through the Dynamic Invocation Interface (DII). The stub represents the mapping between the language of implementation of the client proxy object the ORB core. Thus the client proxy object can be written in any language as long as the implementation of the ORB supports this mapping. The ORB Core then transfers the request to the object implementation which receives the request as an up-call through either an IDL skeleton, or a dynamic skeleton.

In providing services to client proxy objects in CORBA, the OMG security service specification defines client-server security authentication functions in terms of the CORBA programming model. A strong decoupling relationship between this security service implementation and the ORB implementation is present. With the current implementations, dynamically providing security mechanisms for different specifications or protocols is absent.

Therefore, it would be advantageous to have an improved method and apparatus for specifying a security mechanism for use in connections between objects.

SUMMARY OF THE INVENTION

The present invention provides a method and apparatus in a computer system for establishing a connection between a client proxy object and a server target object. A request is received from the client proxy object to access the server target object, wherein the request includes an identification of a type of communication. The request also may include a type of message to be sent to the server target object. A connection object is identified based on the type of communication, the type of message, and quality of protection. The connection object implementing the type of communication is returned, wherein the connection between the client proxy object and the server target object is facilitated using the connection object. A server target object is an object that provides the function or implementation of the object in the server process.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
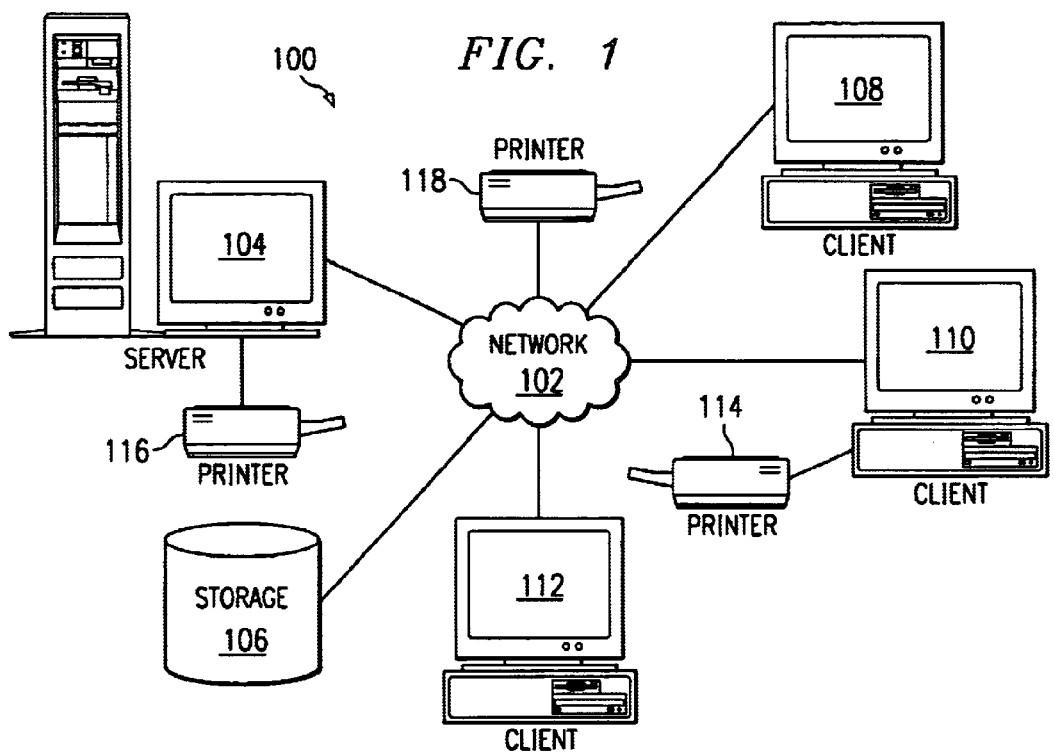
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110, and 112 are also connected to network 102. These clients 108, 110, and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 also includes printers 114, 116, and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an Intranet or a local area network.

FIG. 1 is intended as an example and not as an architectural limitation for the processes of the present invention.

Figure 2:
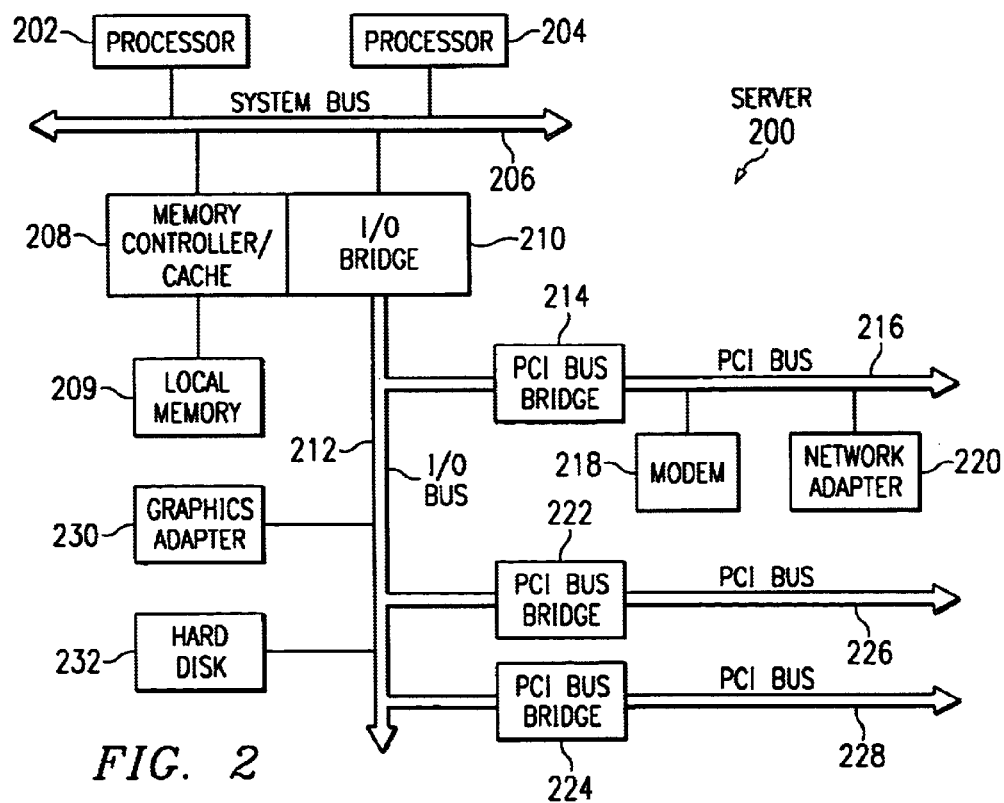
FIG. 2 is a block diagram of a data processing system, which may be implemented as a server in accordance with a preferred embodiment of the present invention.

Referring to FIG. 2, a block diagram of a data processing system which may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
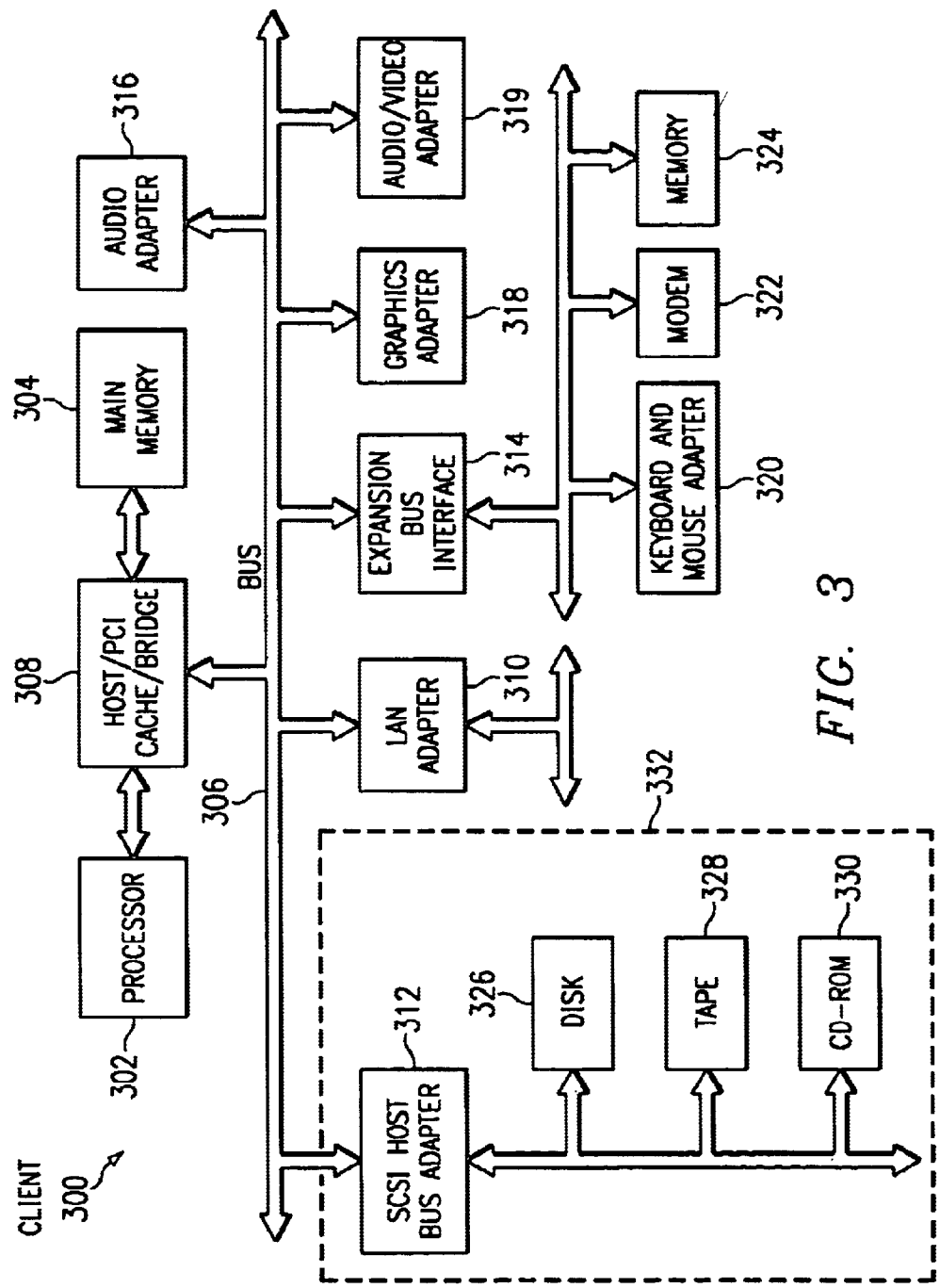
FIG. 3 is a block diagram of a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape-drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for selecting a connection with a particular security mechanism in response to requests from a client proxy object to access a server target object. In the depicted examples, this mechanism is provided through the use of a connection interceptor used in association with an object request broker. The connection interceptor includes processes that are used to support any number of security mechanisms for a connection between a client proxy object and a server target object. In the depicted examples, the connection interceptor provides this support using security mechanisms present in an OMG security service. The connection interceptor determines the type of connection to make by scanning a profile for information regarding the client's security requirements. These security requirements may include, for example, the type of security mechanism and the quality of protection. The security mechanism may be, for example, secure sockets layer (SSL) or distributed computing environment (DCE). The quality of protection may be for example, confidentiality, integrity, out of sequence detection, replay detection, etc.

When one object communicates with another object, an ORB is the middleware that establishes the client-server relationships between objects. Using an ORB, a client proxy object can transparently invoke a method on a server target object, which can be on the same machine or across a network. The ORB intercepts the call and is responsible for finding an object that can implement the request, pass it the parameters, invoke its method, and return the results. The client does not have to be aware of where the object is located, its programming language, its operating system, or any other system aspects that are not part of an object's interface. In so doing, the ORB provides interoperability between applications on different machines in heterogeneous distributed environments and seamlessly interconnects multiple object systems.

In fielding typical client/server applications, developers use their own design or a recognized standard to define the protocol to be used between the devices. Protocol definition depends on the implementation language, network transport and a dozen other factors. ORBs simplify this process and provide flexibility. They let programmers choose the most appropriate operating system, execution environment and even programming language to use for each component of a system under construction. More importantly, ORBs allow the integration of existing components. In an ORB-based solution, developers simply model the legacy component using the same interface that they use for creating new objects, then write "wrapper" code that translates between the standardized bus and the legacy interfaces.

CORBA is an ORB that represents an important advance towards object-oriented standardization and interoperability. With CORBA, users gain access to information transparently without having to know on which software or hardware platform the information resides or where it is located within a network. The goal in CORBA object development is the creation and registration of an server target object, or simply server. A server target object is a program, which contains the implementation of one or more object types and which has been registered with the ORB.

CORBA details an object bus that lets objects communicate across enterprises and even continents. CORBA was designed to allow intelligent components to discover each other and inter-operate on an object bus. However, CORBA goes beyond just inter-operability. It also specifies an extensive set of bus-related services for creating and deleting objects, accessing them by name, storing them in persistent stores, externalizing their states, and defining ad-hoc relationships between them.

CORBA is an integration technology, not a programming technology. It is specifically designed to be the glue that binds disparate programming technologies together. CORBA does not exist as a point in the programming space-by design, it occupies the spaces between the points representing individual languages. For example, when a client implemented using Java uses CORBA technology to communicate with a C++ object, both the C++ programmer and the Java programmer work completely within their respective language environments. The CORBA ORB presents the Java client with a Java stub interface and the C++ programmer with a C++ skeleton interface. CORBA resolves the cross-language issues automatically.

CORBA offers an integration-oriented point of view, where design efforts focus on the boundaries between elements of the system. The underlying interface technologies (e.g., IIOP) are designed to make those boundaries as flexible, adaptive, and programming technology-independent as possible. Interface technologies, such as CBRBA, not only have longer half-lives than programming technologies, they are the best defense against the adding and death of applications due to dependence on obsolete programming technology.

Figure 4:
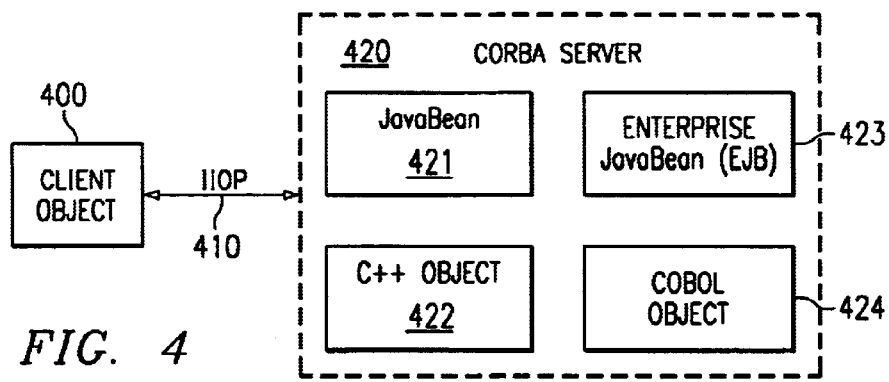
FIG. 4 is a diagram illustrating a distributed application using the CORBA standard in accordance with a preferred embodiment of the present invention.

With reference now to FIG. 4, a diagram illustrating a distributed application using the CORBA standard is depicted in accordance with a preferred embodiment of the present invention. The mechanisms of the present invention may be implemented within such a distributed application.

In FIG. 4, client proxy object 400 communicates with CORBA server target object 420 using the IIOP standard illustrated as communication link 410. CORBA server target object 420 provides integration and interoperability for disparate types of software objects. JavaBean 421, C++ object 422, Enterprise JavaBean (EJB) 423, and COBOL object 424 communicate and register with service functions using the CORBA services provided by server target object 420. Client proxy object 400 may invoke functions and methods provided by objects 421–424 through the CORBA services.

Figure 5:
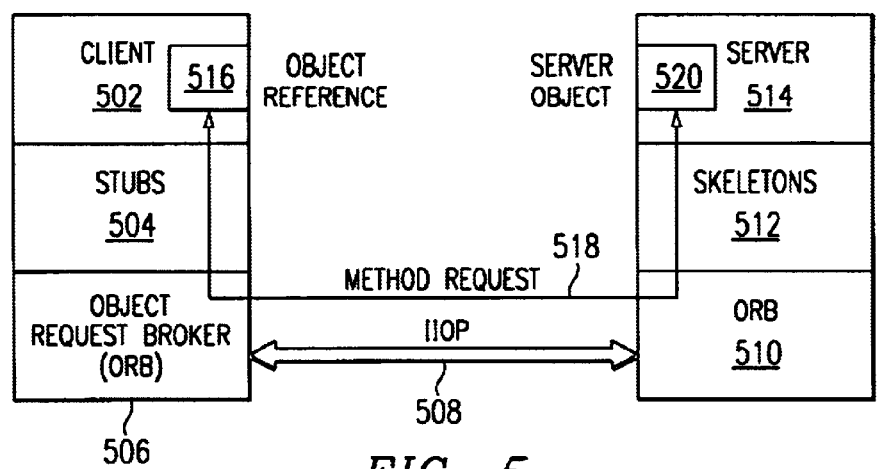
FIG. 5 is a diagram depicting the components in a distributed application that may implement a connection interceptor in accordance with a preferred embodiment of the present invention.

With reference now to FIG. 5, a diagram depicts the components in a distributed application that may implement a connection interceptor in accordance with a preferred embodiment of the present invention. FIG. 5 shows method request 518 sent from client 502 to a CORBA object implementation in a server target object. A client is any code, perhaps itself a CORBA object, that invokes a method on a CORBA object. Servant 520 is an instance of the object implementation—the actual code and data that implements the CORBA object.

Client 502 of a CORBA server target object has object reference 516 for the server target object and the client uses this object reference to issue method request 518.

An object reference is the information needed to specify an object within an ORB. Clients typically obtain object references in a few different ways. First, a client can invoke a "create" method on an object in order to create the object. The create method would return an object reference for the new object to the client. Second, a client could obtain an object reference by issuing a request to a naming service. A naming service stores object references by name in a data structure, and a client may lookup or resolve object references by the object's associated name rather than some type of hard coded network address, i.e., locate an object within the same physical machine or elsewhere on the network. Further, the present invention provides a mechanism in which an object implementing a desired security mechanism may be used to provide a connection between a client and a server target object.

If the server target object is remote, the object reference points to stub function 504, which uses the ORB machinery to forward invocations to the server target object. A CORBA client proxy object needs a local ORB object to perform all of its data marshalling and IIOP work. The stub code uses ORB 506 to identify the machine that runs the server target object and asks that machine's ORB 510 for a connection to the object's server target object 514. When the stub code has the connection, it sends the object reference and parameters to skeleton code 512 linked to the destination object's implementation. The skeleton code transforms the call and parameters into the required implementation-specific format and calls the object. Any results or exception are returned along the same path.

The client proxy object has no knowledge of the CORBA object's location, implementation details, nor which ORB is used to access the object. Different ORBs may communicate via Internet InterORB Protocol (IIOP) 508.

A client proxy object may only invoke methods that are specified in the CORBA object's interface. An interface defines an object type and specifies a set of named methods and parameters as well as the exception types that these methods may return. A client proxy object of a server target object has access to an object reference for the server target object and invokes operations on the object. A client proxy object knows only the logical structure of the server target object according to its interface and experiences the behavior of the server target object through method invocations. It is important to realize that the client-server relationship is relative to two particular objects—the implementation of one server target object may be a client proxy object of other server target objects.

The stub and skeleton files are generated in a variety of ways. Stub files present the client proxy object with access to server target object methods in the client proxy object programming language. The server target object skeleton files glue the object implementation to the ORB runtime. The ORB uses the skeletons to dispatch methods to the object implementation instances (servants).

Figure 6:
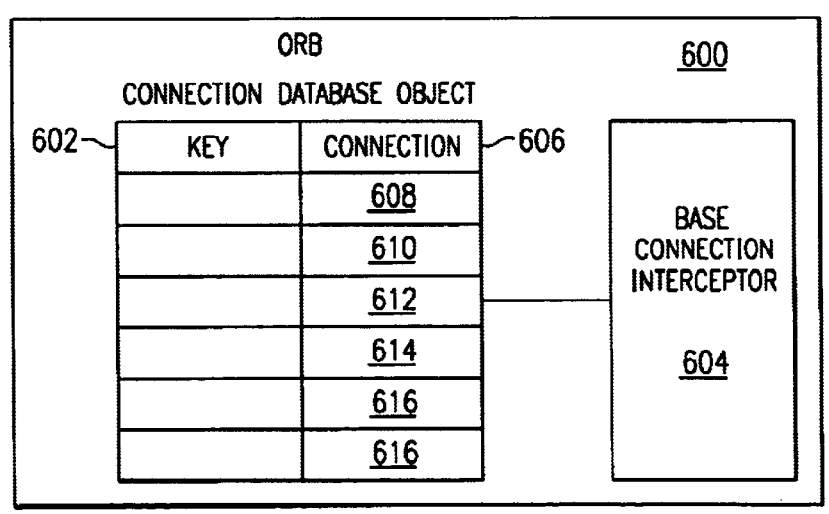
FIG. 6 is a diagram illustrating a object request broker (ORB) with a connection database object and a connection interceptor in accordance with a preferred embodiment of the present invention.

Turning next to FIG. 6, a diagram illustrating a object request broker (ORB) with a connection database object and a connection interceptor is depicted in accordance with a preferred embodiment of the present invention. ORB 600 contains a connection database object 602 and a base connection interceptor 604. These components are used to return a connection object to be used by a client proxy object communicate with a server target object. Base connection interceptor 604 is activated when the ORB, on behalf of the client proxy object, requests a connection to a server target object.

Connection database object 602 stores information about connection objects in entries 606–618. Connection objects are wrappers for underlying communication layers, such as transmission control protocol (TCP), SSL, and DCE. In this example, a reference to a connection object is stored in each of entries 606–618. Each of these entries are indexed by keys. These keys are generated by base connection interceptor 604 using information supplied by connection database object 602 about the target object.

In this example, security is not required or provided—the security services are not enabled for use with the ORB. As a result, keys returned by base connection interceptor 604 to index an entry within connection database object 602 may only include basic information, such as a target ID and a port ID. The target ID identifies the server target object while the port ID identifies a port used to address the server target object. For example, port 80 on an Internet node indicates a web server.

Figure 7:
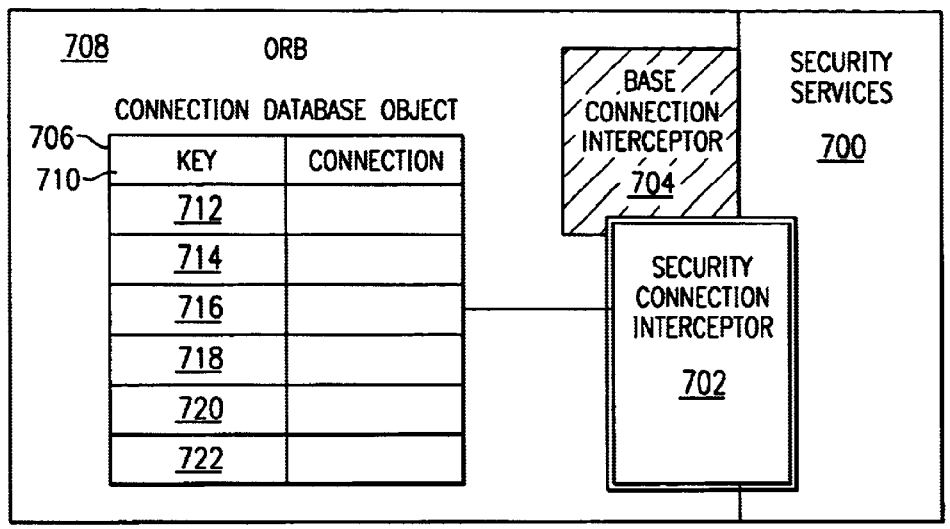
FIG. 7 is a diagram of an ORB implementing security services in accordance with a preferred embodiment of the present invention.

With reference now to FIG. 7, a diagram of an ORB implementing security services is depicted in accordance with a preferred embodiment of the present invention. When security services 700 is to be used to specify security mechanisms, security connection interceptor 702 replaces base connection interceptor 704. Security connection interceptor 702 will return more complex keys reflecting a need for a more secure connection between a client proxy object and a server target object. Security connection interceptor 702 uses information supplied by connection database object 706 within ORB 708 to generate a key to index entries 710–722 in connection database 706.

In addition to a target ID and a port ID, the key generated by security connection interceptor 702 is contained in a connection data object also includes information about the type of connection. The information within the connection data object and the key allows a client proxy object and a server target object to form connections using different security mechanisms with different quality of protection. The type of connection may be changed on a per message basis between the client proxy object and the server target object. The present invention may be applied to a connection shared between multiple client proxy objects and multiple server target objects. Information or data about an object is normally obtained from the ORB. When changing the type of connection on a per message basis, current information about the object will be required to identify changes in configuration data for the object.

Figure 8:
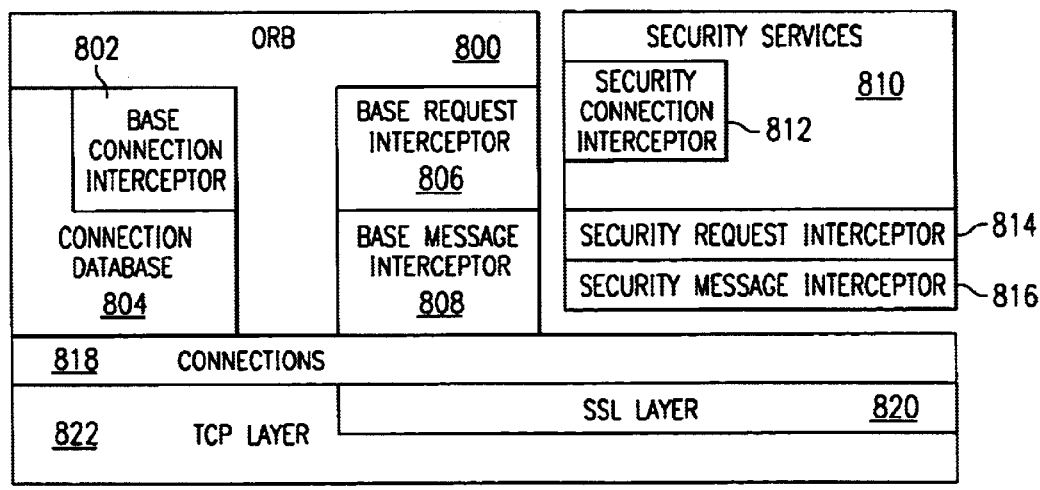
FIG. 8 is a block diagram of functional units within an ORB and functional units within security services in accordance with a preferred embodiment of the present invention.

With reference now to FIG. 8, a block diagram of functional units within an ORB and functional units within security services is depicted in accordance with a preferred embodiment of the present invention.

In this example, ORB 800 includes a base connection interceptor 802, a connection database object 804, a base request interceptor 806, and a base message interceptor 808. Security services 810 include a security connection interceptor 812, a security request interceptor 814, and a security message interceptor 816. Both ORB 800 and security services 810 are in a layer above connection layer 818, which provides an interface to SSL layer 820 and TCP layer 822. Connection layer 818 provides the interface between client proxy objects and server target objects. Base connection interceptor 802 typically is present when security services 810 is not initialized. When registered with ORB 800, security connection interceptor 812 replaces base connection interceptor 802 when security services 810 are initialized. Security services 810 may be initialized based on configuration data supplied at run time. If this service is initialized, security connection interceptor 812, security request interceptor 814, and security message interceptor 816 are all registered with ORB 800. The request interceptors and the message interceptors illustrated in FIG. 8 are known interceptors while base connection interceptor 802 and security connection interceptor 812 are new interceptors provided by the present invention. These new interceptors will process a GetConnection request before any other interceptor processes such a message in these examples.

Although the depicted example in FIG. 8 illustrates the use of a SSL mechanism for security and a TCP mechanism when security is not required, the mechanisms of the present invention may be used to select other types of security mechanisms in addition to or in place of SSL. For example, DCE also may be used.

Figure 9:
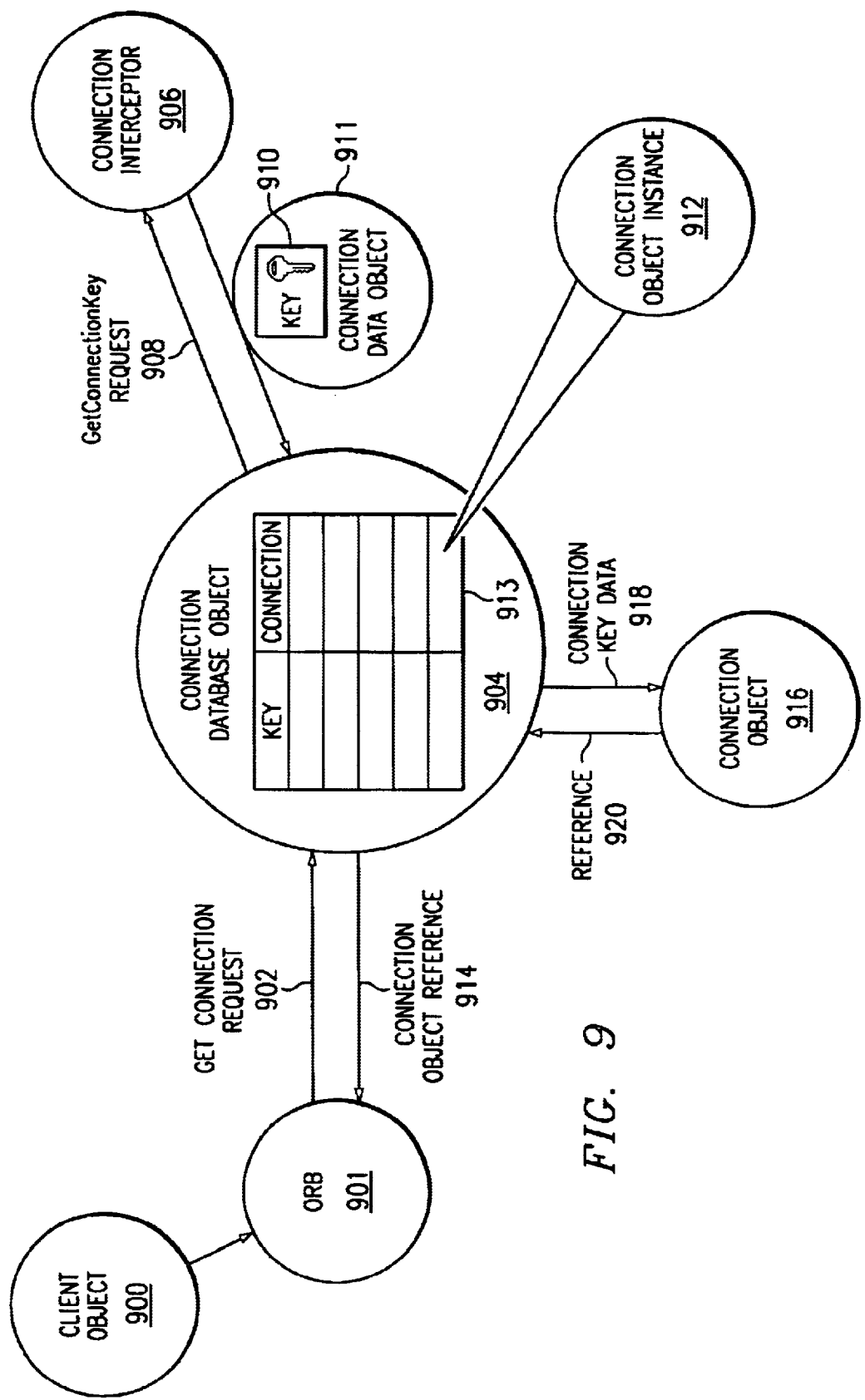
FIG. 9 is a data flow diagram illustrating use of a connection interceptor in accordance with a preferred embodiment of the present invention.

Turning next to FIG. 9, a data flow diagram illustrating use of a base connection interceptor is depicted in accordance with a preferred embodiment of the present invention. This diagram illustrates data flow in which security services are not being used with an ORB. In such an example, a secure connection between a client proxy object and a server target object is not provided.

In this example, client proxy object 900 desires to send a message to an object. Object request broker (ORB) 901 sends a request, GetConnection request 902, for a connection to the ORB, which is handled by connection database object 904 within the ORB. This request is made by ORB 901 because client proxy object 900 wants to send a message to a target, e.g., server target object. In this example, no security mechanism is requested by object request broker 901 for establishing a connection to a server target object. Connection database object 904 passes information about the target and the message to be sent to connection interceptor 906 in a GetConnectionKey request 908. This information about the target and the message is obtained from GetConnection request 902.

In response, connection interceptor 906 generates key 910, also called a "connection key", based on the information in the target server profile. In this example, key 910 is a simple key containing the target ID and the port ID (i.e. port number or address) because no security mechanism is required in this particular example. Key 910 is then returned to connection database object 904 in a connection data object 911. Connection data object 911 is an object that also includes the connection type and the quality of protection for the connection. Connection database object 904 uses key 910 contained within connection data object 911 as an index to look up a connection object in database 913.

If an existing connection object, such as connection object 912 is identified, this object is returned to client proxy object 900 via object request broker 901 using connection object reference 914. Connection data object 911 is attached to a connection object and used to pass data to that object and other objects. Connection object 912 is an instance of connection object 916, which is a reference to connection object 912. If a connection object does not exist, connection database object 904 will attempt to create an instance of a connection object using the information contained in key 910. This call is made to connection object 916 by passing connection key data 918 found in key 910 to connection object 916. If successful, a reference 920 to an instance of connection object 916, connection object 912, is returned to database object 904. In turn, connection database object 904 will store the reference to the created connection object using key 910 returned from connection interceptor 906. The information in key 910 will serve as an index to the created connection object. This connection object is then returned to client proxy object 900 by returning a reference to the connection object to client proxy object 900 via object request broker 901.

Figure 10:
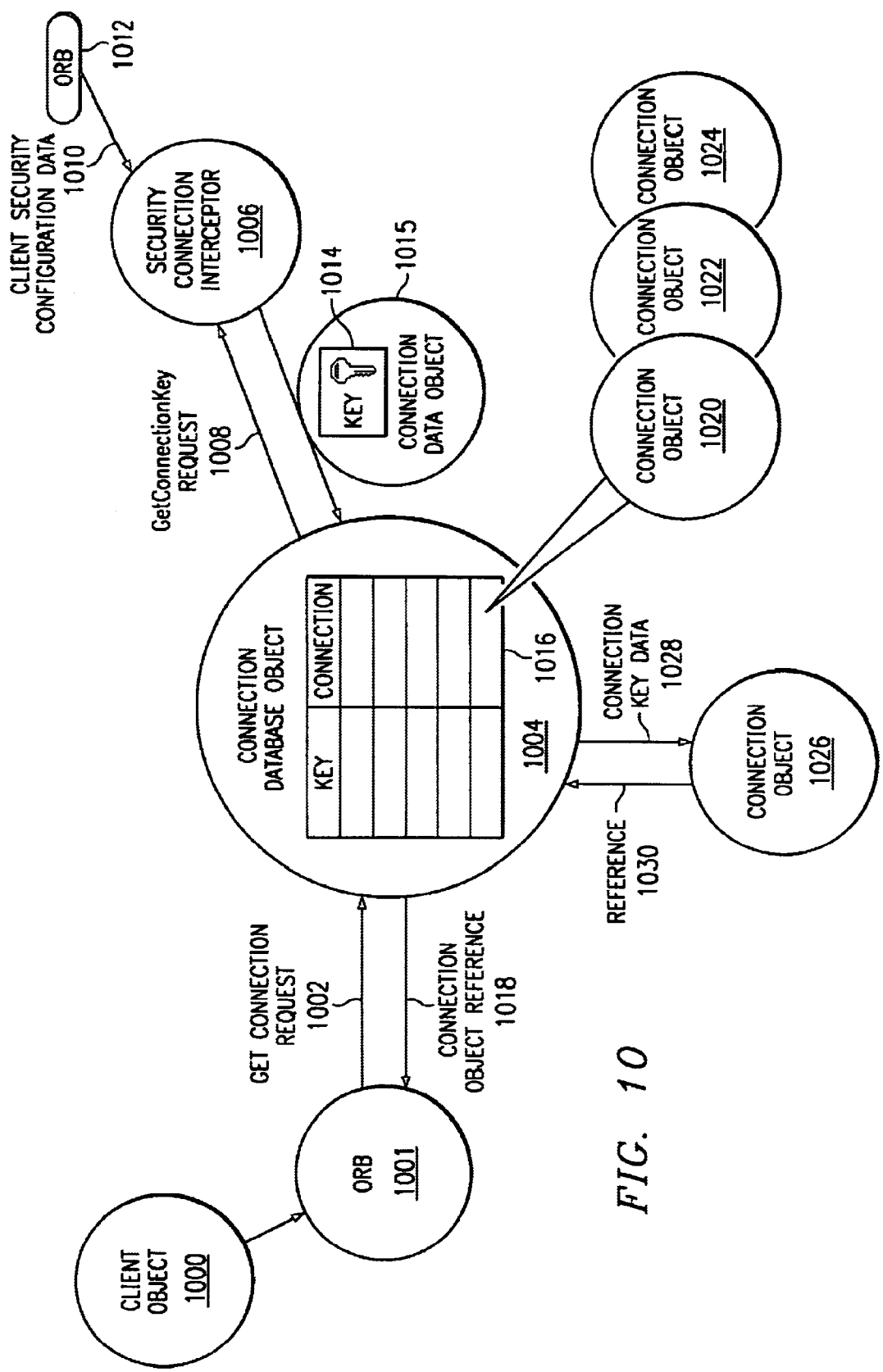
FIG. 10 is a data flow diagram illustrating the use of a security connection interceptor in accordance with a preferred embodiment of the present invention.

Turning next to FIG. 10, a data flow diagram illustrating the use of a security connection interceptor is depicted in accordance with a preferred embodiment of the present invention. The data flow illustrated in FIG. 10 occurs when security services are enabled for use in association with the ORB.

In the depicted example, client proxy object 1000 desires to send messages to a target and causes object request broker 1001 to send a GetConnection request 1002 to connection database object 1004 to request a connection to a target, such as a server target object. This request includes a request for a secure connection. Connection database object 1004 passes information about the target and the information to be sent to security connection interceptor 1006 in a GetConnectionKey request. In response to receiving this request, security connection interceptor 1006 uses the target server profile (target ID, port ID, supported security mechanisms, and quality of protection (QOP) required and supported) in GetConnection request 1008 and the client security configuration data 1010 from ORB 1012 to form a key 1014 based on the security requirements of the client proxy object, client proxy object 1000, and the server target object. This key includes an identification of the security mechanism to be used along with the quality of the protection for the connection.

Key 1014 is returned to connection database object 1004 in connection data object 1015. Connection database object 1004 uses key 1014 to locate a connection object within database 1016. Database 1016 includes information about connection objects, which are indexed and accessed using keys.

If a connection object is found within database 1016, a connection object reference 1018 is returned to client proxy object 1000, which uses the reference to establish a connection to the server target object with the referenced connection object. The keys in database 1016 reference a number of connection objects, such as connection objects 1020, 1022, and 1024. Each of these connection objects are instances of connection object 1026. Connection data object 1015 may be passed to the identified connection objects.

These connection objects may provide a specific type of security mechanism to a particular quality of protection. For example, connection object 1020 may provide a SSL security mechanism with encryption for the quality of protection, while connection object 1022 provides a SSL security mechanism with integrity for the quality of protection. Alternatively, the type of connection may provide no security, such as a TCP or UDP connection.

If a connection object matching key 1014 does not exist, then connection database object 1004 will attempt to create a new connection object by sending connection key data 1028 to connection object 1026. In this example, this connection key data is obtained using information contained within key 1014. As mentioned before, key 1014 includes information about the security mechanism that is to be used to protect the connection between the client proxy object and the server target object along with the required quality of protection. For example, a connection object may be initialized using SSL with the quality of protection specified in key 1014 being used to set a characteristic for the connection object.

If an instance of a connection object is successfully created, then a reference 1030 to the created connection object is returned to connection database object 1004, which will store the reference to the connection object in database 1016 using key 1014 as an index to the new connection object. Thereafter, the new connection object is returned to client proxy object 1000 by sending a reference to the new connection object to client proxy object 1000 via object request broker 1001.

Figure 11:
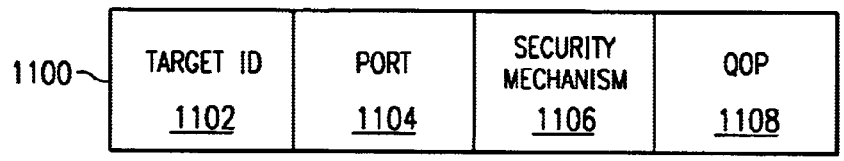
FIG. 11 is a block diagram of a key in accordance with a preferred embodiment of the present invention.

Turning next to FIG. 11, a block diagram of a key is depicted in accordance with a preferred embodiment of the present invention. Key 1100 is an example of a key returned by a security connection interceptor when a client requests a connection to a server target object. Key 1100 includes a target ID field 1102, which is used to identify the target. For example, an IP address or DNS name may be used to identify the target. Port ID field 1104 identifies the node on which the target is located. The connection type field 1106 identifies the security mechanism that is be used, e.g., SSL and DCE. If no security mechanism is to be used, the connection type could be for example, TCP. Quality of protection field 1108 indicates the quality of protection to be used with a particular security mechanism such as confidentiality, message integrity, no encryption, or detect replay of message, etc.. A key returned by a connection interceptor when security services are not enabled or initiated for use with the ORB, would be simpler and only include a target ID and a port ID.

Figure 12:
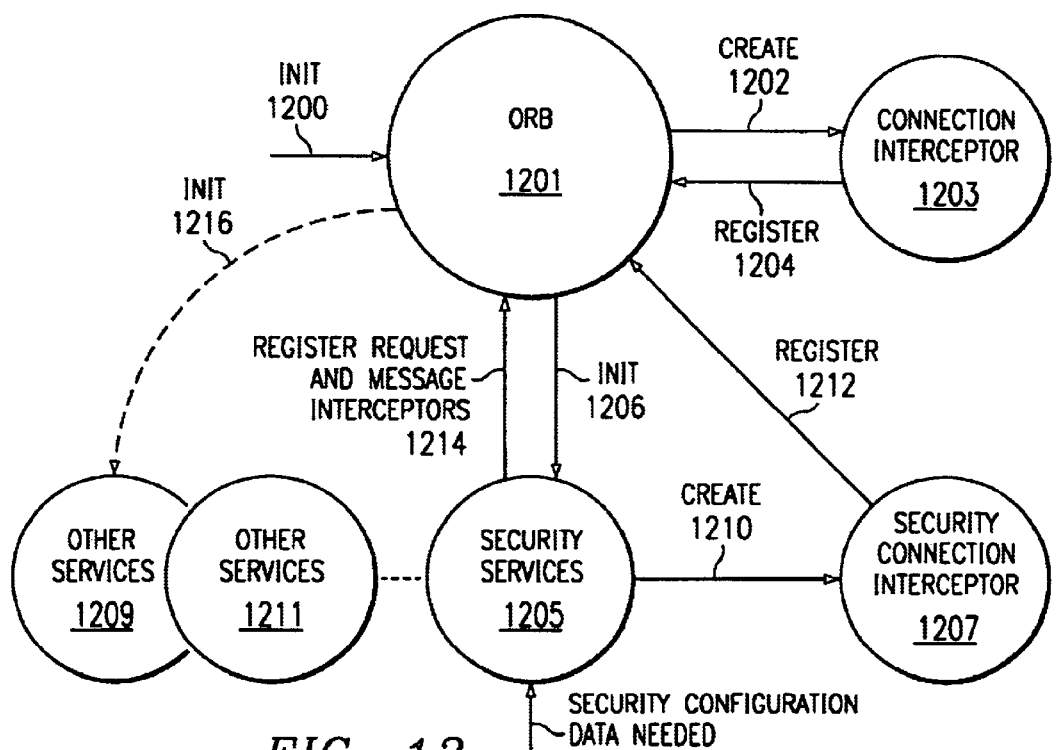
FIG. 12 is a diagram illustrating steps performed when an ORB is initialized in accordance with a preferred embodiment of the present invention.

With reference now to FIG. 12, a diagram illustrating steps performed when an ORB is initialized is depicted in accordance with a preferred embodiment of the present invention. A new ORB 1201 is created (step 1200). ORB 1200 then creates a connection interceptor 1203 (step 1202). Connection interceptor 1203 then registers itself with ORB 1201 (step 1204). Steps 1200–1204 occur before any messages are sent.

When security services 1205 is initialized (step 1206), this service uses security configuration data to determine whether it is necessary to secure messages flowing between a client proxy object and a server target object (step 1208). If security is required, then security services 1205 creates an instance of security connection interceptor 1207 (step 1210). In turn, security connection interceptor 1207 registers itself with ORB.1201 (step 1212). This registration replaces connection interceptor 1203 with security connection interceptor 1207. Thereafter, security services 1205 creates an instance of a request interceptor and a message interceptor and registers these with ORB 1201 (step 1214).

ORB 1201 then initializes the other services (step 1216). In this example, the services include services 1209 and 1211. These services may be, for example, without limitation, a persistent object service, which provides a set of common interfaces to the mechanisms used for retaining and managing the persistent state of objects; a concurrency control service, which enables multiple clients to coordinate access to sheared resources; and a naming service, which provides an ability to bind a name to an object relative to a naming context, which is an object that contains a set of name bindings in which each name is unique. The services decide, based on configuration data whether that particular service is required.

Figure 13:
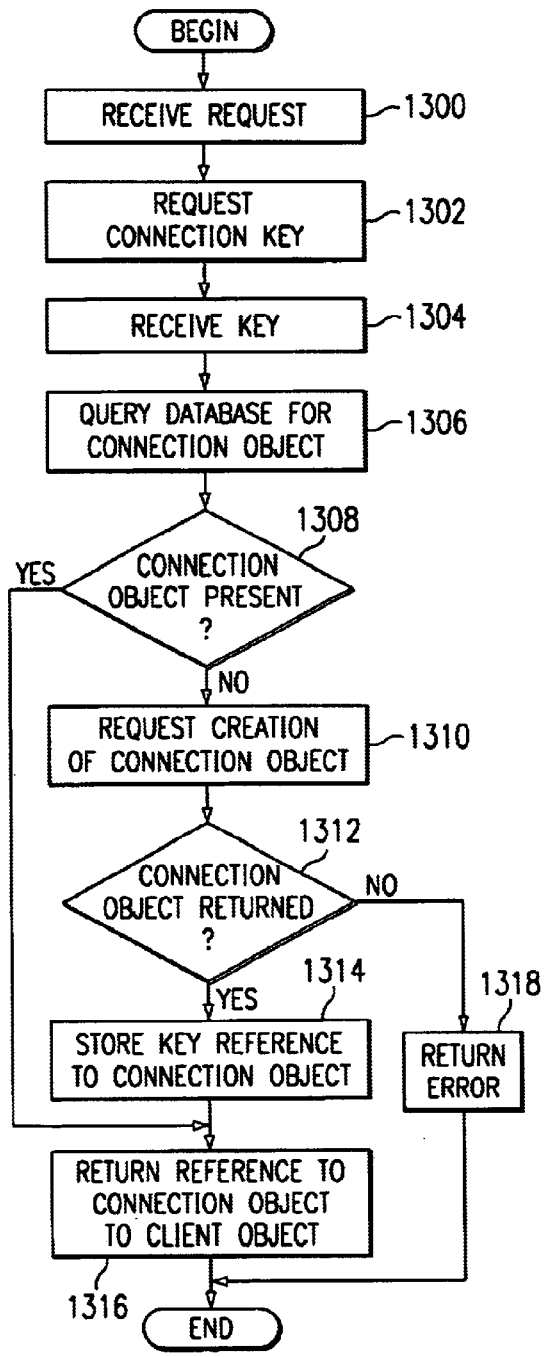
FIG. 13 is a flowchart of a process used by a connection database object in accordance with a preferred embodiment of the present invention.

With reference now to FIG. 13, a flowchart of a process used by a connection database object is depicted in accordance with a preferred embodiment of the present invention. The process begins by receiving a request from a client proxy object to access a server target object (step 1300). This request includes information about the server target object including it's name, listening port, and security requirement. In response to receiving the request, the connection database object will request a connection key from a security connection interceptor (step 1302). In response to the request, the connection database object receives a key (step 1304). The key is used as an index to the database to search for an appropriate connection object. The database for the connection database object is then queried to identify a connection object (step 1306). Although this example employs the use of a database, the information about connection objects is not limited to databases and may be stored in another type of data structure. A determination is then made as to whether a reference to a connection object, matching the key, is present within the database (step 1308).

If an appropriate connection object is not present, the connection database object will request creation of an instance of a connection object having the appropriate parameters to match the key (step 1310). In the depicted example, the request to create an instance of a connection object is made to a connection object. Appropriate parameters, such as the quality of protection, are sent to the connection object. In response, a determination is made as to whether a connection object is returned (step 1312). If a connection object is returned, the key and the reference to the connection object are stored in the database (step 1314), and the reference to the connection object is returned to the client proxy object (step 1316) with the process terminating thereafter.

Turning back to step 1312, if a connection object is not returned, an error is then returned to the client proxy object (step 1318). With reference again to step 1308, if a connection object is identified in the query of the database, then the process proceeds to step 1316 to return the reference to the connection object to the client proxy object.

Figure 14:
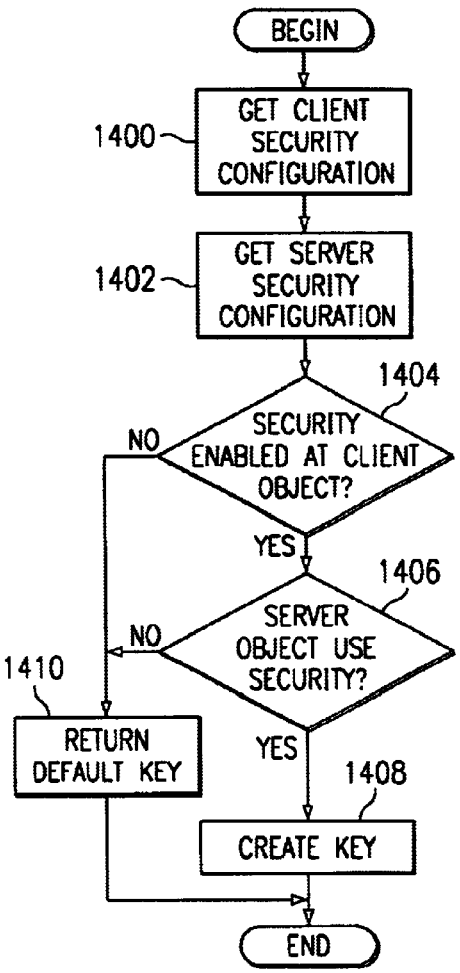
FIG. 14 is a flowchart of a process used to create a connection key in accordance with a preferred embodiment of the present invention.

With reference now to FIG. 14, a flowchart of a process used to create a connection key is depicted in accordance with a preferred embodiment of the present invention. This process is implemented in a security connection interceptor. The process begins by obtaining client security configuration information (step 1400). This information is received from the ORB and includes a security mechanism and QOP. Thereafter, server security configuration information is obtained (step 1402). This information includes target ID, port ID, and available security mechanisms including QOP supported and required. This information is also received from the QRB. A determination is then made as to whether security is enabled at the client proxy object (step 1404). If security is enabled, a determination is then made as to whether the server target object uses the security enabled for use at the client proxy object (step 1406). If the server uses the security mechanism, a key is created based on the identified information (step 1408) with the process terminating thereafter.

With reference again to steps 1404 and 1406, if security is not enabled at the client proxy object or the server does not use the security mechanism enabled at the client proxy object, a default key is returned to the connection database object (step 1410) with the process terminating thereafter. The connection type identified in this key may be a connection mechanism that involves no security or some security mechanism known to be useable by both the client proxy object and the server target object.

Figure 15:
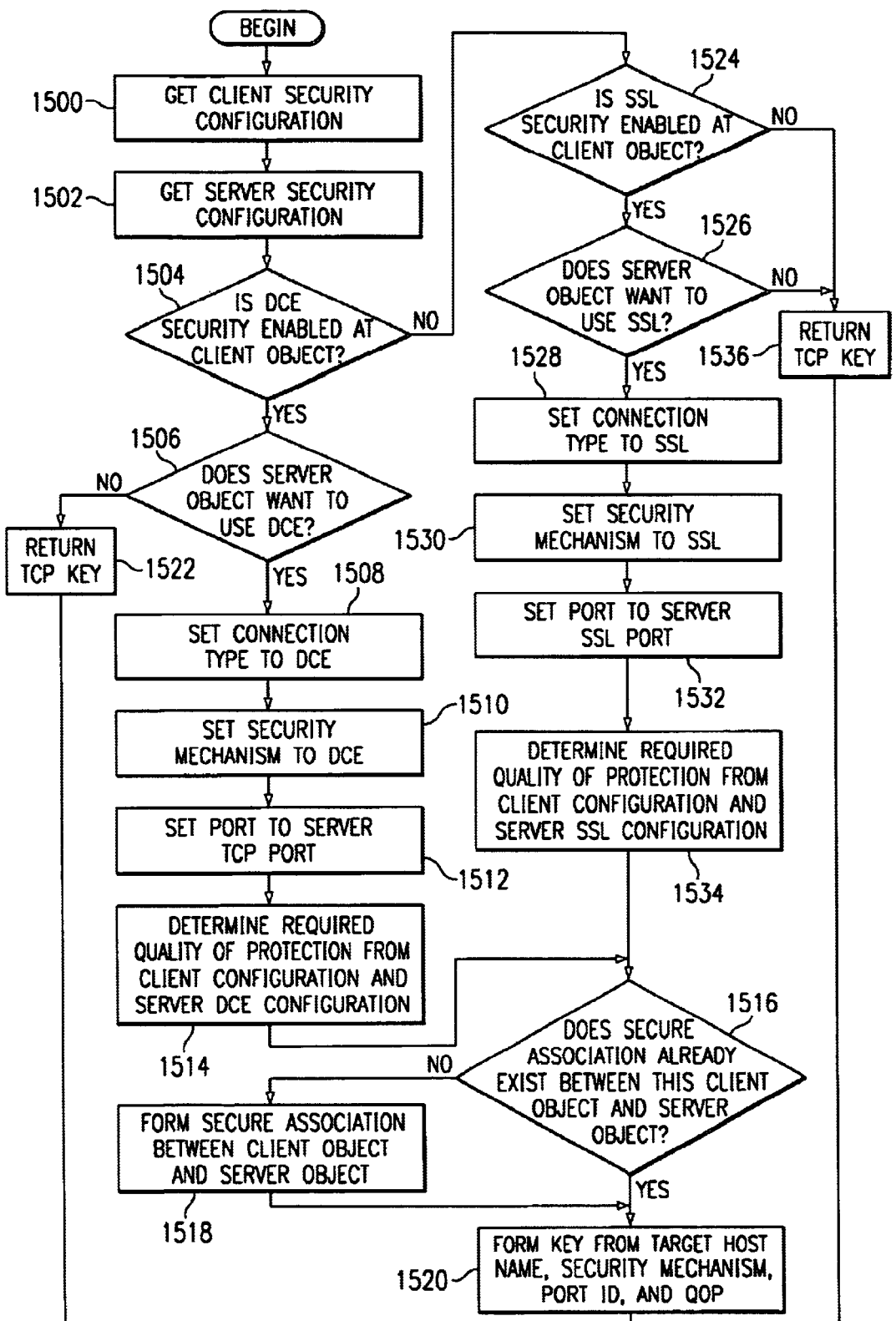
FIG. 15 is a flowchart of a process used to generate a key in accordance with a preferred embodiment of the present invention.

With reference now to FIG. 15, a flowchart of a process used to generate a key is depicted in accordance with a preferred embodiment of the present invention. This flowchart provides an example of a process for generating a key in a system that supports TCP, DCE, and SSL connection types. The flowchart in this process also may be implemented within a security connection interceptor.

The process begins by obtaining client security configuration information (step 1500) and by obtaining server security configuration information (step 1502). Then, a determination is made as to whether DCE security is enabled at the client proxy object (step 1504). If DCE security is enabled, then a determination is made as to whether the server target object will use DCE (step 1506). If the server target object will use DCE, then the connection type is set equal to DCE (step 1508). The security mechanism is then set equal to DCE (step 1510).

The connection type is found in the connection data object, while the security mechanism is found in the key, which is contained within the connection data object. The port is then set to the server TCP port (step 1512). Next, the required quality of protection is determined from the client configuration and the server DCE configuration (step 1514).

Then, a determination is made as to whether a secure associate already exists between the client proxy object and the server target object (step 1516). If a secure association is not present, such an association is formed between the client proxy object and the server target object (step 1518). Thereafter, a key is formed containing the target host name or ID, the port ID, the security mechanism, and the quality of protection (step 1520) with the process terminating thereafter.

With reference again to step 1506, if the server does not use DCE, then a TCP key is returned (step 1522) with the process terminating thereafter. In this example, the TCP key is a default key.

With reference again to step 1504, if DCE security is not enabled at the client proxy object, then a determination is made as to whether SSL security is enabled at the client proxy object (step 1524). If SSL security is enabled, then a determination is made as to whether the server target object will use SSL (step 1526). If the server target object will use SSL, then the connection type is set equal to SSL (step 1528). The security mechanism is then set equal to SSL (step 1530). The port is then set to the server SSL port (step 1532). Next, the required quality of protection is determined from the client configuration and the server SSL configuration (step 1534). Thereafter, the process proceeds to step 1516 as previously described.

With reference again to step 1526, if the server target object does not use SSL, then a TCP key is returned (step 1534) with the process terminating thereafter. Again, the TCP key in this example is a default key. In step 1524, if SSL is not the security enabled at the client proxy object, the process also proceeds to step 1534 to return a TCP key.

The connection interceptor and the security connection interceptor of the present invention may be dynamically registered by any service requiring connections to have certain characteristics. Specifically, each service may register its own connection interceptor.

Also, a connection interceptor can be used for all types of connections as it is not tied to a specific security mechanism or only applicable to a security service. It can be generalized to other types of services, which require specific connection characteristics. For instance, a service which requires the ability to broadcast messages to many listeners could us a connection interceptor to request a connection which is configured to allow for many listeners.

A connection interceptor can be dynamic at the individual message or request level. For example, certain types of requests may need flow over secured connections while others may flow over unsecured connections. As another example, some requests may need to be broadcast while others may be intended only for a single listener.

Though the example describes a single-instance, replaceable connection interceptor, the concept can be extended to allow multiple connection interceptors to be registered and executed at run-time. Each connection interceptor would be invoked in some defined order and would have an opportunity to add its requirements for determining the connection to use when sending the request. The requirements may be placed into the key.

Since connection interceptors can also be used as a communication mechanism between an executor, in this case an ORB, and a requester, some methods of the connection interceptor can be used as callbacks to pass other information from executor to requester such as whether an existing connection has been broken. When the callback is executed, the requester can then take the appropriate action.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples illustrate the use of a security connection interceptor for providing connections between a client proxy object and a server target object, the connection interceptor of the present invention may be applied to providing connections for services requiring a connection to have certain characteristics including, those other than security and quality of protection. For example, user datagram protocol (UDP) may be specified for a connection in place of TCP. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for identifying a connection between a client proxy object and a server target object, the method comprising the computer system implemented steps of:

receiving a request from the client proxy object to access the server target object, wherein the request includes an identification of a type of communication and type of message to be sent to the server target object;

identifying a connection object based on the type of communication and the type of message; and returning the connection object implementing the type of communication, wherein the connection between the client proxy object and the server target object is facilitated using the connection object.

2. The method of claim 1, wherein the step of identifying further includes:

identifying the connection object based on information about the client proxy object and the server target object.

3. The method of claim 1, wherein the client proxy object and the server target object reside on a single computer within the computer system.

4. The method of claim 1, wherein the client proxy object is located on a first computer within the computer system and the server target object is located on a second computer within the computer system.

5. The method of claim 1, wherein the connection object provides a transmission control protocol connection between the client proxy object and the server target object.

6. The method of claim 1, wherein the connection object provides distributed computing network connection between the client proxy object and the server target object.

7. The method of claim 1, wherein the connection object provides a Secure Sockets Layer connection between the client proxy object and the server target object.

8. A method in a computer system for identifying a connection between a client proxy object and a server target object, the method comprising the computer system implemented steps of:

receiving a request from the client proxy object to access the server target object, wherein the request includes an identification of a type of communication;

determining whether the type of communication is enabled at the client;

responsive to a determination that type of communication is enabled at the client, determining whether the server target object uses the type of communication; and responsive to a determination that the server target object uses the type of communication, returning an identification of a connection object implementing the type of communication, wherein the connection between the client proxy object and the server target object is facilitated using the connection object.

9. A computer system comprising:

object request broker;

a security service;

a connection database object; and a connection interceptor.

10. A data processing system in a computer system for establishing a connection between a client proxy object and a server target object, the data processing system comprising:

receiving means for receiving a request from the client proxy object to access the server target object, wherein the request includes an identification of a type of communication and type of message to be sent to the server target object;

identifying means for identifying a connection object based on the type of communication and the type of message; and returning means for returning the connection object implementing the type of communication, wherein the connection between the client proxy object and the server target object is facilitated using the connection object.

11. The data processing system of claim 10, wherein the identifying means further includes:

identifying means for identifying the connection object based on information about the client proxy object and the server target object.

12. The data processing system of claim 10, wherein the client proxy object and the server target object reside on a single computer within the computer system.

13. The data processing system of claim 10, wherein the client proxy object is located on a first computer within the computer system and the server target object is located on a second computer within the compute system.

14. The data processing system of claim 10, wherein the connection object provides a transmission control protocol connection between the client proxy object and the server target object.

15. The data processing system of claim 10, wherein the connection object provides distributed network environment connection between the client proxy object and the server target object.

16. The data processing system of claim 10, wherein the connection object provides a Secure Sockets Layer connection between the client proxy object and the server target object.

17. A data processing system in a computer system for identifying a connection between a client proxy object and a server target object, the data processing system comprising:

receiving means for receiving a request from the client proxy object to access the server target object, wherein the request includes an identification of a type of communication;

first determining means for determining whether the type of communication is enabled at the client;

second determining means, responsive to a determination that type of communication is enabled at the client, for determining whether the server target object uses the type of communication; and returning means, responsive to a determination that the server target object uses the type of communication, for returning an identification of a connection object implementing the type of communication, wherein the connection between the client proxy object and the server target object is facilitated using the connection object.

18. A computer program product in a computer readable medium for identifying a connection between a client proxy object and a server target object, the computer program product comprising:

first instructions for receiving a request from the client proxy object to access the server target object, wherein the request includes an identification of a type of communication and type of message to be sent to the server target object;

second instructions for identifying a connection object based on the type of communication and the type of message; and third instructions for returning the connection object implementing the type of communication, wherein the connection between the client proxy object and the server target object is facilitated using the connection object.

19. A computer program product in a computer readable medium for establishing a connection between a client proxy object and a server target object, the computer program product comprising:

first instructions for receiving a request from the client proxy object to access the server target object, wherein the request includes an identification of a type of communication;

second instructions for determining whether the type of communication is enabled at the client;

third instructions, responsive to a determination that type of communication is enabled at the client, for determining whether the server target object uses the type of communication; and fourth instructions, responsive to a determination that the server target object uses the type of communication, for returning an identification of a connection object implementing the type of communication, wherein the connection between the client proxy object and the server target object is facilitated using the connection object.

\* \* \* \* \*